United States Patent
Chelminski et al.

(10) Patent No.: US 11,583,370 B2
(45) Date of Patent: Feb. 21, 2023

(54) PACKAGING FOR DENTAL IMPLANT COMPONENTS

(71) Applicant: BIOMET 3I, LLC, Palm Beach Gardens, FL (US)

(72) Inventors: Alexander Chelminski, Jupiter, FL (US); Dan P Rogers, Palm Beach Gardens, FL (US); Elizabeth A Schlueter, Tequesta, FL (US); Miguel Montero, Boynton Beach, FL (US)

(73) Assignee: Biomet 3i, LLC, Palm Beach Gardens, FL (US)

( * ) Notice: Subject to any disclaimer, the term of this patent is extended or adjusted under 35 U.S.C. 154(b) by 261 days.

(21) Appl. No.: 16/802,207

(22) Filed: Feb. 26, 2020

(65) Prior Publication Data
US 2020/0275999 A1    Sep. 3, 2020

Related U.S. Application Data

(60) Provisional application No. 62/812,206, filed on Feb. 28, 2019.

(51) Int. Cl.
*A61C 8/00*    (2006.01)

(52) U.S. Cl.
CPC .......... *A61C 8/0087* (2013.01); *A61C 8/008* (2013.01); *A61C 2202/00* (2013.01)

(58) Field of Classification Search
CPC .................................................. A61C 8/0087
See application file for complete search history.

(56) References Cited

U.S. PATENT DOCUMENTS

| | | | |
|---|---|---|---|
| 5,437,550 A * | 8/1995 | Beaty | A61C 8/0089 433/141 |
| 6,913,465 B2 * | 7/2005 | Howlett | A61C 8/0087 206/63.5 |
| 7,770,722 B2 | 8/2010 | Donahoe et al. | |
| 2004/0043358 A1 * | 3/2004 | Howlett | A61C 8/0087 433/141 |
| 2005/0023166 A1 * | 2/2005 | Howlett | A61C 8/0087 206/369 |
| 2007/0059088 A1 | 3/2007 | Chan | |
| 2010/0236947 A1 * | 9/2010 | Liao | A61C 8/0087 206/63.5 |

(Continued)

FOREIGN PATENT DOCUMENTS

| | | |
|---|---|---|
| DE | 102016118584 | 5/2017 |
| WO | 0230315 | 4/2002 |
| WO | 03059190 | 7/2003 |

OTHER PUBLICATIONS

"European Application Serial No. 20159792.9, Extended European Search Report dated Jul. 17, 2020", 10 pgs.

(Continued)

*Primary Examiner* — Ralph A Lewis
(74) *Attorney, Agent, or Firm* — Sheridan Ross P.C.

(57) ABSTRACT

Packaging systems for dental implants and methods for implanting a packaged implant are provided herein. The packaging system includes a housing and a cap forming an enclosure for a dental implant and corresponding healing screw. The housing includes a first and second base portion that interact with a platform that receives a portion of the dental implant to present the dental implant to a user during use.

20 Claims, 12 Drawing Sheets

(56) References Cited

U.S. PATENT DOCUMENTS

2010/0240011 A1    9/2010  Liao
2011/0017623 A1*   1/2011  Guenter ............... A61C 8/0087
                                                  206/63.5
2013/0065197 A1*   3/2013  Mamraev ............ A61C 8/0087
                                                  433/172

OTHER PUBLICATIONS

"Australian Application Serial No. 2020201437, First Examination Report dated Dec. 1, 2020", 7 pgs.
"European Application Serial No. 20159792.9, Response filed Mar. 2, 2021 to Extended European Search Report dated Jul. 17, 2020", 18 pgs.
"European Application Serial No. 20159792.9, Communication Pursuant to Article 94(3) EPC dated Aug. 24, 2021", 4 pgs.
"Australian Application Serial No. 2020201437, Response filed Sep. 16, 2021 to First Examination Report dated Dec. 1, 2020", 21 pgs.
"Australian Application Serial No. 2020201437, Subsequent Examiners Report dated Sep. 30, 2021", 4 pgs.
"Australian Application Serial No. 2020201437, Subsequent Examiners Report dated Oct. 5, 2021", 7 pgs.
"Australian Application Serial No. 2020201437, Response filed Nov. 4, 2021 to Subsequent Examiners Report dated Oct. 5, 2021", 20 pgs.
"Australian Application Serial No. 2020201437, Subsequent Examiners Report dated Nov. 5, 2021", 5 pgs.
"Australian Application Serial No. 2020201437, Response filed Nov. 9, 2021 to Subsequent Examiners Report dated Nov. 5, 2021", 16 pgs.
"Australian Application Serial No. 2020201437, Subsequent Examiners Report dated Nov. 12, 2021", 4 pgs.
"Australian Application Serial No. 2020201437, Response filed Nov. 16, 2021 to Subsequent Examiners Report dated Nov. 12, 2021", 17 pgs.
Notice of Acceptance for U.S. Patent Application No. 2020201437, dated Nov. 23, 2021 3 pages.

* cited by examiner

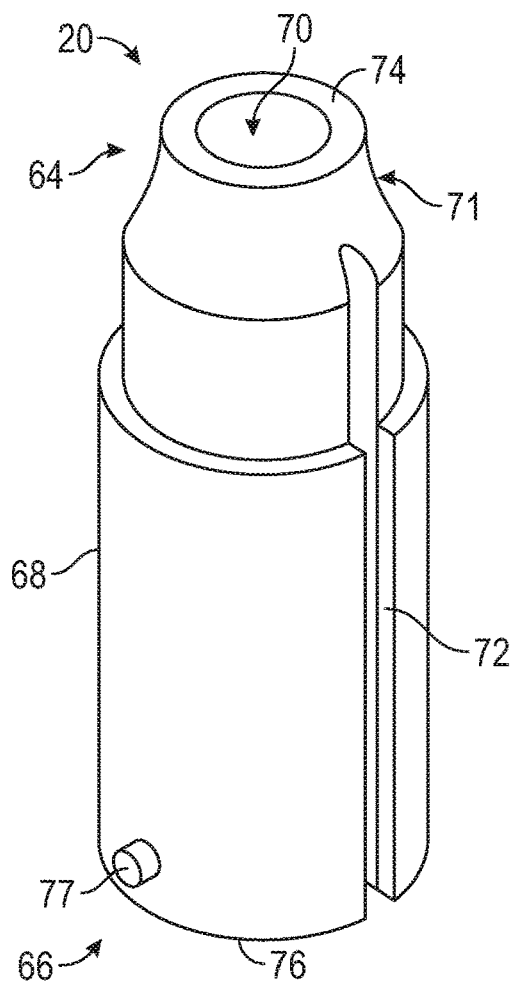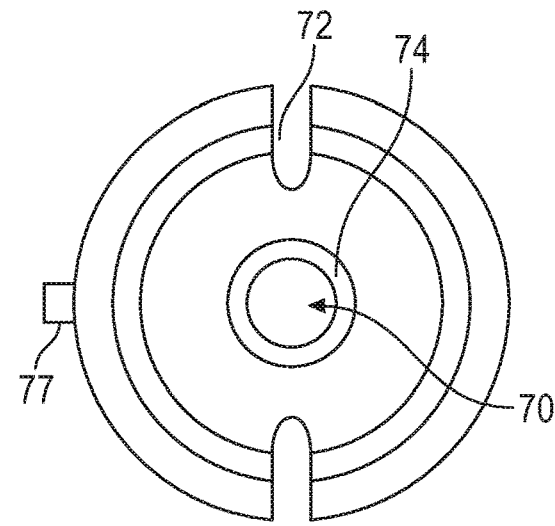
FIG. 4A
FIG. 4B
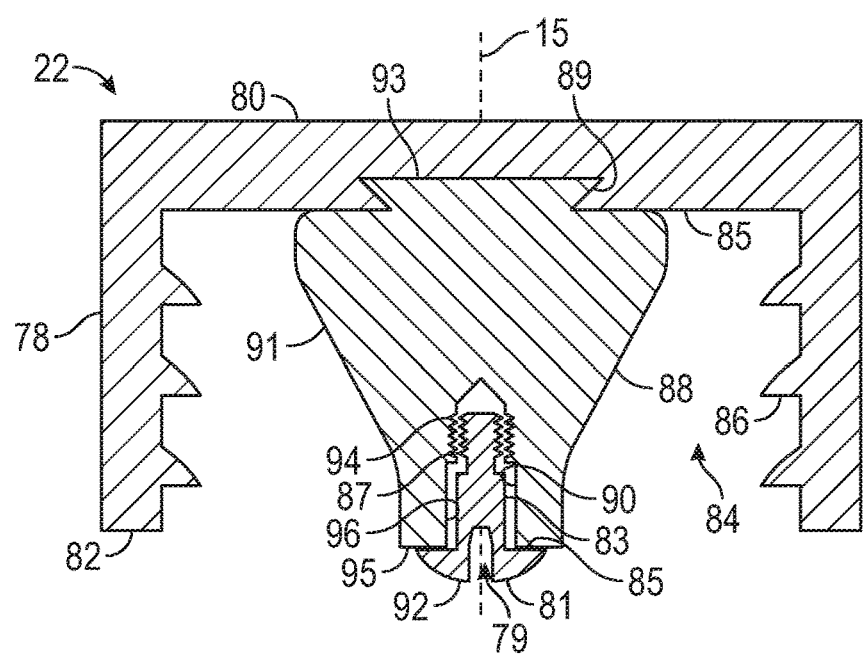
FIG. 5

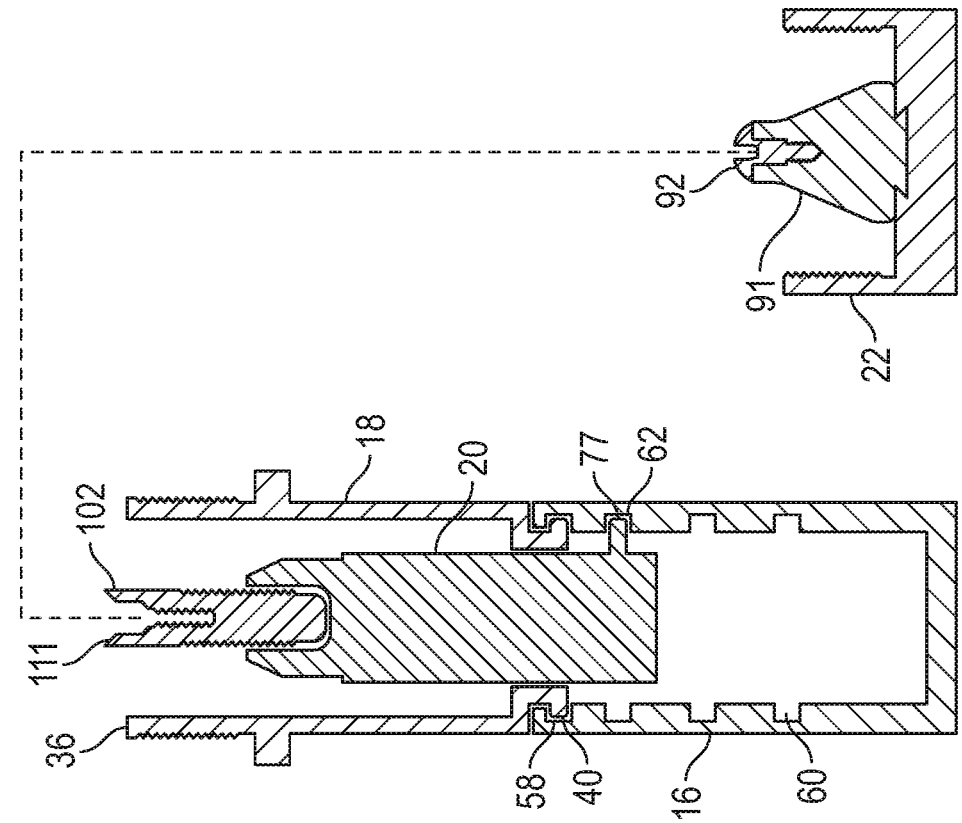
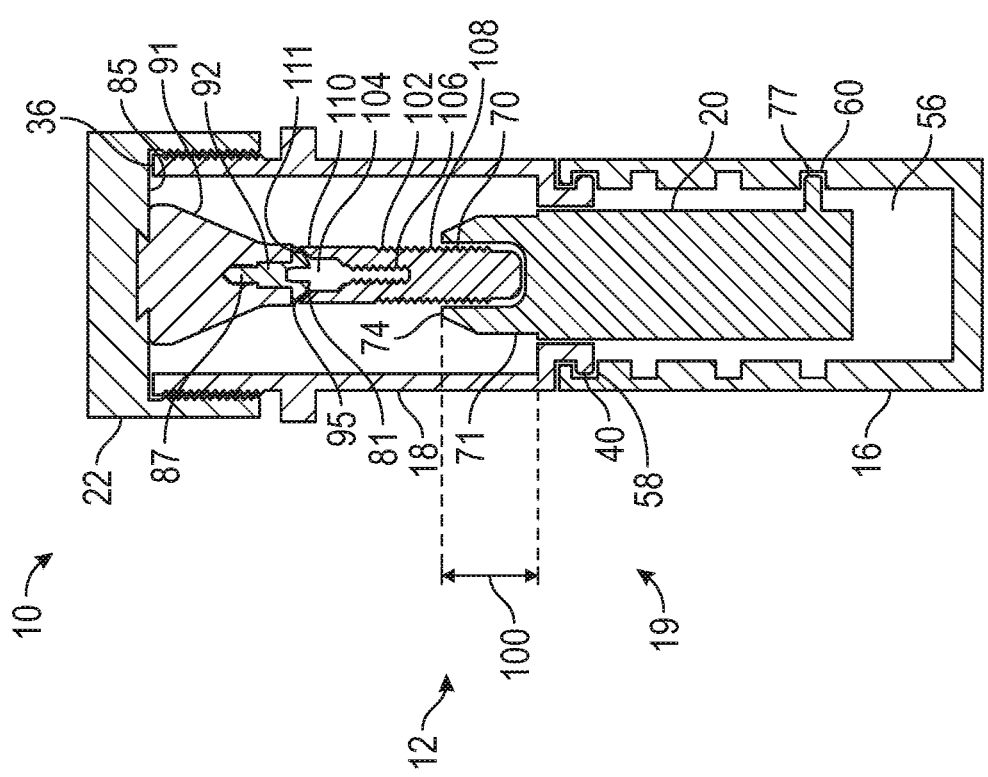

PACKAGING FOR DENTAL IMPLANT COMPONENTS

CLAIM OF PRIORITY

This application claims the benefit of U.S. Provisional Patent Application Ser. No. 62/812,206, filed on Feb. 28, 2019, the benefit of priority of which is claimed hereby, and which is incorporated by reference herein in its entirety.

TECHNICAL FIELD

This document pertains generally, but not by way of limitation, to packaging of medical implants. More particularly, this disclosure relates to, but not by way of limitation, a packaging system for housing medical implant components including dental implant components for use during a surgical procedure.

BACKGROUND

Generally, medical implants are inserted into a body to restore the function of or replace the anatomy of a patient. It is desirable to present the implants, and components for use therewith, to a surgical site in a sterile, sealed package. For example, a dental implant and a healing screw are stored within a sterile package until they are removed therefrom and implanted within the mouth of the patient. More specifically, the dental implant is removed from the package and threaded into the mandible or maxilla of the patient. Thereafter, the healing screw is inserted into an interior cavity in the implant so that debris or tissue does enter the interior cavity of the implant during the healing process. After the healing process, a prosthesis that replicates a natural tooth is attached to the implant.

Current sterile packaging for dental implants include nylon bags, trays with foil, Tyvek lids, or plastic vials. At the time of use, these protective materials are opened and discarded. To maintain the sterile environment, it is beneficial to minimize handling and contact with the dental components prior to implantation. What is needed is an improved package that provides a sterile enclosure for, yet provides convenient access to, a dental implant and the components for use therewith

OVERVIEW

Various factors contribute to the success of an implanted dental implant. Early stage complications can be caused from excessively traumatic surgical approach, bone overheating during the osteotomy creation, and bacterial contamination of the host site. Infections arising during the first few post-operative days present with edema, exudate, and pain. Infections are caused by bacterial contamination during surgery either directly via accidental contact with the implants or indirectly from gloves or instruments.

Maintaining the sterile surface of dental implant components from when the packaging is opened to the implant site can help reduce infection. Accordingly, the present inventors have determined that reducing the amount of contact or handling of the dental implant components between opening the sterile packaging to implanting the dental components into the implant site is advantageous. The present invention is directed toward dental implant packaging systems that present the dental components for use such that the dental components can be delivered to the implantation site without touching by anything other than delivery tools and/or gloved hands or otherwise jeopardizing the sterility of the dental components. Therefore, the dental implant packaging disclosed herein minimizes the amount of handling or contact with the dental components while removing them from the packaging. As such, the likelihood that a component may be dropped, mishandled, contaminated, or otherwise misplaced is greatly reduced.

The dental implant packaging system includes a housing and a cap that form a protective enclosure for a dental implant and healing screw. During an implant procedure, the cap is separated from the housing. A portion of the housing is rotated to raise and present the dental component to the user. Since the dental implant is presented to the user in a secured fashion, a user can either use a tool and/or use their gloved fingers to grab the dental implant from the housing and place at the implant site. The cap is configured to hold a dental component, e.g., a healing screw, such that once the cap is placed on, e.g., a surgical table, the healing screw is visible and presented to the user. Since the healing screw is presented to the user, a user can use a tool and/or their fingers to remove the healing screw from the cap and immediately couple it to the inserted dental implant.

The invention, accordingly, comprises the system and method possessing the construction, combination of elements, and arrangement of parts which are exemplified in the following detailed description. For a fuller understanding of the nature and objects of the invention, reference should be made to the following detailed description taken in connection with the accompanying drawings.

This Overview is intended to provide non-limiting examples of the present subject matter—it is not intended to provide an exclusive or exhaustive explanation. The Detailed Description below is included to provide further information about the present apparatuses and methods.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4A illustrates a perspective view of a platform of the dental implant packaging shown in FIG. 1.

FIG. 4B illustrates a top down view of the platform shown in FIG. 4A.

FIG. 5 illustrates a cross-sectional view of the cap shown in FIG. 1 including a healing screw.

FIG. 6A illustrates a cross-sectional view of the assembled dental implant packaging system shown in FIG. 1 including a dental implant and the healing screw.

FIG. 6B illustrates the dental implant packaging system of FIG. 6A with the cap removed and the dental implant presented to the user.

DETAILED DESCRIPTION

The present application relates to packaging systems and devices for dental components and methods for accessing dental components to facilitate implanting a dental implant within an implant site. The Figures are all related to various examples of packaging systems for dental components including dental implants and healing screws. While not shown, other examples using similar systems, devices, and methodologies are contemplated. This includes, but is not limited to, other medical implants including screws, delivery tools, and implants for other areas of the body such as shoulder, hips, hands, feet, and the like.

Figure 1:
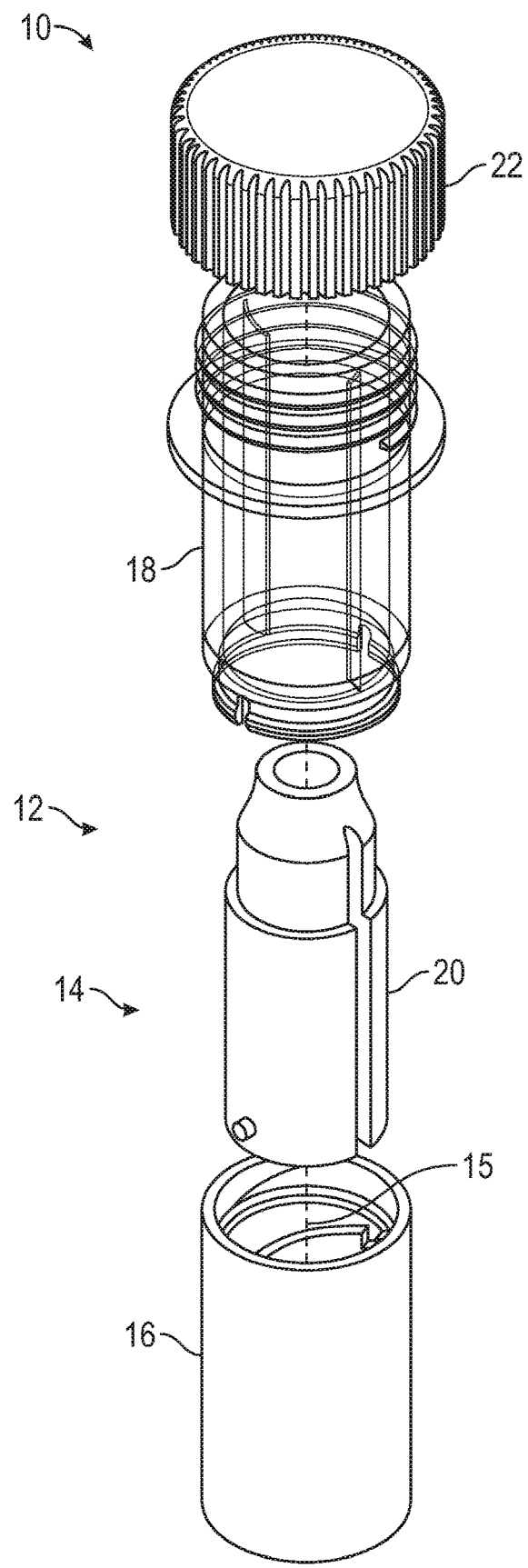
FIG. 1 illustrates an expanded view of a dental implant packaging system, in accordance with at least one example of the disclosure.

FIG. 1 illustrates an expanded view of a dental implant packaging system 10 (also referred to herein as "system 10") in accordance with at least one example of the disclosure. The system 10 includes a housing 12 and a cap 22 that can be coupled together to seal a dental implant within the system 10. The housing 12 includes a base 14 and a platform 20. The base 14 includes a first base portion 16 rotatably coupled to a second base portion 18. The platform 20 is positioned and moveable within the base 14. The platform 20 is configured to hold an implant, e.g., dental implant, or component/tool. The first and second base portions 16, 18 are rotatably coupled such that the first base portion 16 can rotate relative the second base portion 18 and vice versa. In one embodiment, the first base portion 16 of the base 14 can be rotated relative to the second base portion 18 to move the platform 20 upward until a stop is reached. Moving the position of the platform 20 within the base 14 moves the dental implant that is being held within the platform 20 toward a top of the base 14 where the dental implant can be presented to and picked up using tools and/or fingers of a user.

Figure 2A:
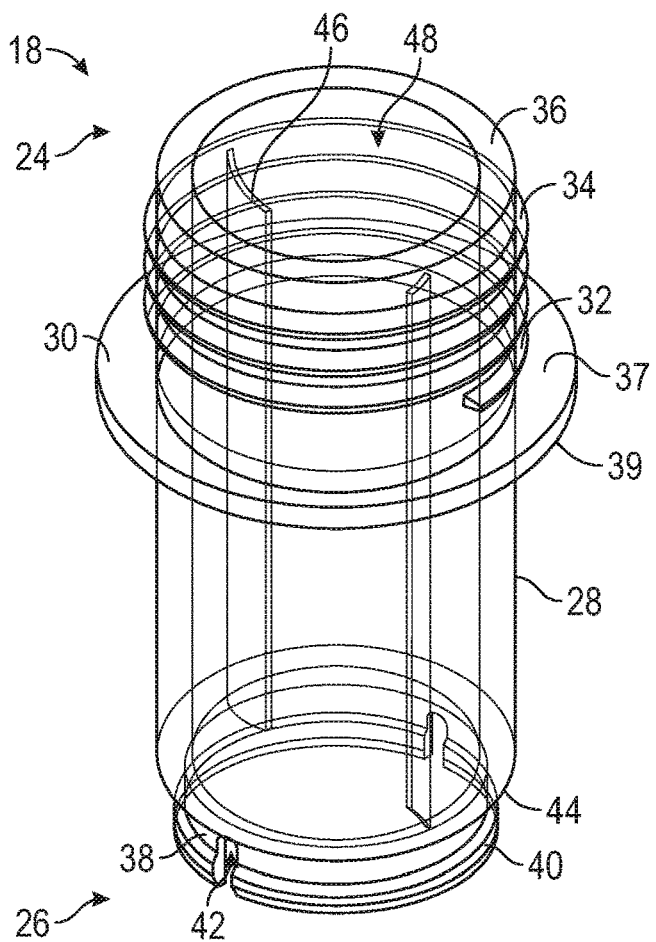
FIG. 2A illustrates a transparent perspective view of a portion of a base of the dental implant packaging shown in FIG. 1.
Figure 2B:
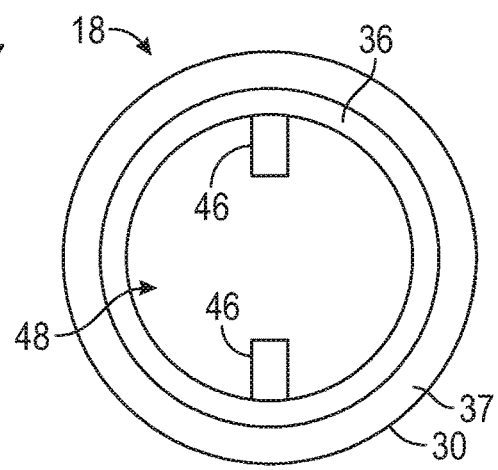
FIG. 2B illustrates a top down view of the portion of the base shown in FIG. 2A.
Figure 3A:
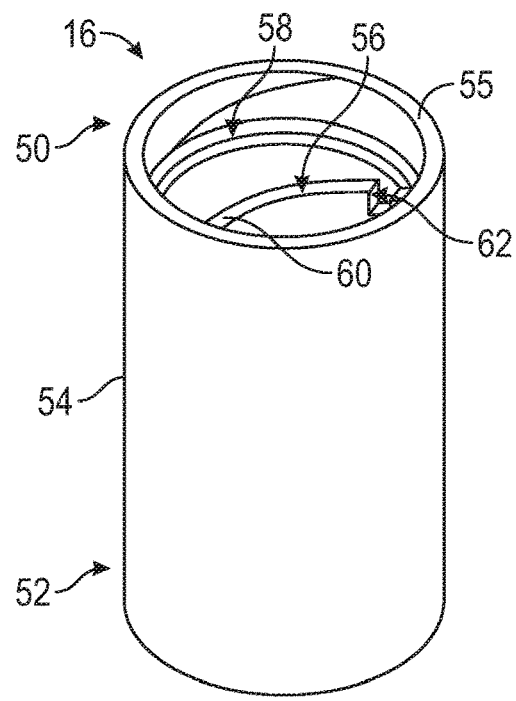
FIG. 3A illustrates a perspective view of another portion of the base of the dental implant packaging shown in FIG. 1.
Figure 3B:
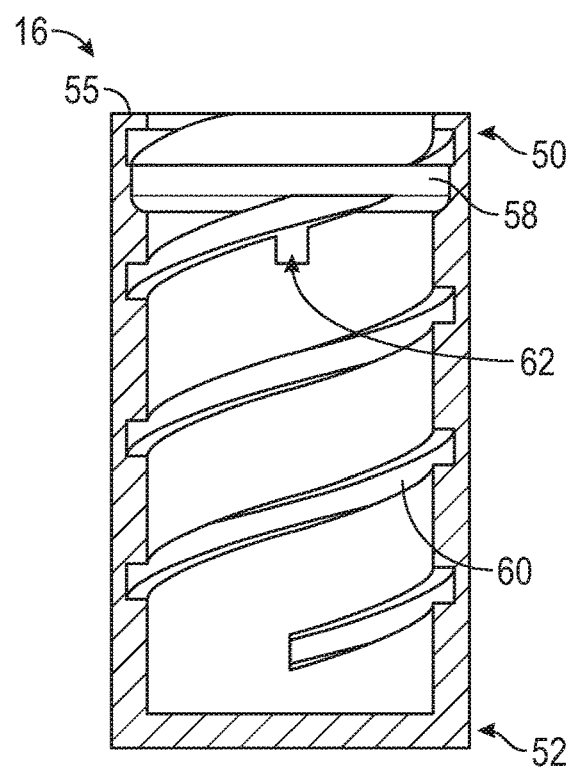
FIG. 3B illustrates a cutaway view of the portion of the base shown in FIG. 3A.

FIGS. 2-4 illustrate components of the housing 12. FIG. 2A illustrates a transparent perspective view and FIG. 2B illustrates a top down view of the second base portion 18 of the base 14 shown in FIG. 1. FIG. 3A illustrates a perspective view and FIG. 3B illustrates a cutaway view of the first base portion 16 of the base 14. FIG. 4A illustrates a perspective view of the platform 20 and FIG. 4B illustrates a top down view of the platform 20.

Referring to FIGS. 1-4, the first and second base portions 16, 18 are configured to be rotatably coupled together. As discussed herein, the second base portion 18 can have a fixed rotational position, e.g. be held in position, while the first base portion 16 is rotated about a longitudinal axis 15 of the housing 12 relative to the second base portion 18. As the first base portion 16 rotates, the platform 20 is moved in a proximal direction to present a dental implant to a user.

The second base portion 18 includes a body 28 extending from a proximal end 24 to a distal end 26. In one example, the body 28 includes a shoulder 30 having a top surface 37 and an opposing bottom surface 39. The body 28 includes an engagement portion 32 that is positioned toward the proximal end 24. For example, the engagement portion 32 is positioned between the shoulder 30 and extends toward the proximal end 24 to a proximal end surface 36. The engagement portion 32 includes mating features 34, e.g., threads, that can interact with corresponding mating features within the cap 22 (e.g., threads 86 shown in FIG. While interacting threads are shown, other coupling mechanisms can be used to secure the cap 22 to the housing 12. In one embodiment, the second base portion 18 can be formed of a transparent material such that the position of the dental component, e.g., dental implant, can be seen by a user while the dental component is enclosed within the housing 12.

The distal end 26 of the second base portion 18 includes a mating portion 38 that is configured to mate with the first base portion 16 of the base 14. As shown in FIG. 2A, the mating portion 38 has a reduced diameter compared to the remaining body 28. A shoulder 44 is defined between the mating portion 38 and the remaining body 28 and can contact a top surface 55 of the first base portion 16 when the first and second base portions 16, 18 are coupled together. The mating portion 38 includes a lip 40 that is configured to be received within a corresponding annular groove 58 of the first base portion 16 of the base 14, shown in FIGS. 3A and 3B. In one embodiment, the mating portion 38 also includes one or more slots 42 that can assist with the insertion of the lip 40 into the annular groove 58 by increasing the flexibility of the mating portion 38. However, the mating portion 38 also may not include the slots 42.

The second base portion 18 defines a bore 48 extending from the proximal end 24 to the distal end 26. The bore 48 acts as a cavity to house the dental implant when the implant is secured within the housing 12, as discussed herein. The bore 48 includes at least one projection 46. As shown in FIG. 2B, the second base portion 18 includes at least two projections 46. Any number of projections 46 can be used, but generally, the number of projections 46 match the number of grooves 72 on the platform 20 (as shown in FIGS. 4A and 4B). When the projections 46 of the second base portion 18 engage with the grooves 72 of the platform 20, the second base portion 18 and the platform 20 are rotationally locked together. Thus, as the first base portion 16 of the base 14 is rotated relative to the second base portion 18, the platform 20 moves toward the proximal end surface 36 of the second base portion 18 but does not rotate about the longitudinal axis 15. That is, the rotational position of the second base portion 18 and the platform 20 remain constant as the first base portion 16 rotates.

The first base portion 16 includes a body 54 extending from a proximal end 50 to a distal end 52. The first base portion 16 includes a bore 56 extending from the proximal end 50 toward the distal and 52. As shown in FIGS. 3A and 3B, the bore 56 is a closed bore and doesn't extend through the distal end 52 of the first base portion 16. The bore 56 includes an annular groove 58 positioned toward the proximal end 50 that is configured to receive the lip 40 of the second base portion 18. When the lip 40 is received within the annular groove 58, the top surface 55 of the first base portion 16 can contact the shoulder 44 of the second base portion 18.

While a lip 40 and groove 58 connection is shown as an example, the first and second base portions 16 and 18 can use any connection that allows rotation between the first and second base portions 16 and 18. That is, while the axial position (i.e., position along the longitudinal axis 15) of the first and second base portions 16, 18 are locked, they are moveable with respect to each other rotationally about the longitudinal axis 15. Moreover, while it is shown that the mating portion 38 of the second base portion 18 is inserted into the bore 56 of the first base portion 16, it is understood that a portion of the first base portion 16 can be inserted into the second base portion 18 during coupling.

The first base portion 16 includes a helical groove 60 extending from the distal end 52 toward the proximal end 50. In one embodiment, the helical groove 60 extends through the annular groove 58 and to the top surface 55 of the first base portion 16. The groove 60 is configured to receive a projection 77 on the platform 40 (see FIGS. 4A and 4B). During use, as user rotates the first base portion 16, while holding the second base portion 18, a projection 77 of the platform 20 slides up the helical groove 60 inside the first base portion 16.

The first base portion 16 includes a slot 62 that is in communication with the helical groove 60. The slot 62 acts as a stop and is configured to receive the projection 77 and stop and lock the position of the platform 20 within the housing 12.

Figure 7:
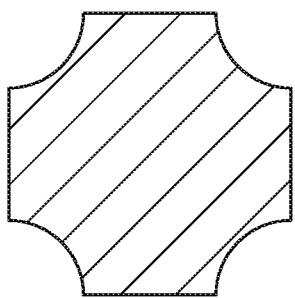
FIG. 7 illustrates a cross-section shape of a first base portion of the housing, in accordance with at least one example of the disclosure.
Figure 8:
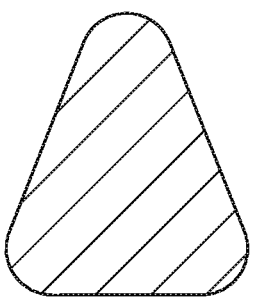
FIG. 8 illustrates a cross-section shape of a first base portion of the housing, in accordance with at least one example of the disclosure.
Figure 9:
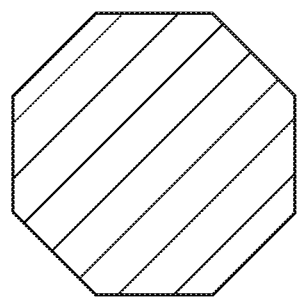
FIG. 9 illustrates a cross-section shape of a first base portion of the housing, in accordance with at least one example of the disclosure.

A cross-sectional shape of a portion of the outer surface of the first base portion 16 can include a variety of shapes. As shown, the cross-sectional shape can be a circle. However, other shapes are contemplated and can assist the user in grasping the first base portion 16 for rotation during use. For example, the cross-sectional shape can be non-circular such as having a polygon shape or other non-circular configurations. Non-limiting examples are shown in FIGS. 7-9. FIG. 7 illustrates the first base portion 16 including knurls, FIG. 8 illustrates the first base portion including a triangle cross-sectional shape, and FIG. 9 illustrates the first base portion 16 including an octagon cross-sectional shape.

FIG. 4A illustrates a perspective view and FIG. 4B illustrates a top down view of the platform 20 shown in FIG. 4A. As discussed herein, the platform 20 retains a dental implant and is movable within the housing 12 to present the dental implant to the user. The platform 20 includes a body 68 extending from a top surface 74 at a proximal end 64 to a bottom surface 76 at a distal end 66. Toward the proximal end 64, the platform 20 includes an implant holder portion 71 configured to receive a portion of the dental component, e.g., dental implant, while the dental implant is secured within the housing 12. In the example shown in FIGS. 4A and 4B, the implant holder portion 71 includes a bore 70 that is configured to retain the dental implant. As discussed herein, various methods for retaining the dental implant can be used. In one embodiment, the bore 70 includes threads configured to engage with threads of the dental implant. In other embodiments, friction can be used. In other embodiments, other means are used to keep the dental implant within the bore 70. For example, space limitations between the top of the dental implant when the dental implant is positioned within the implant holder portion and a portion of the cap such that movement of the dental implant is limited.

The platform 20 includes a projection 77 that is configured to be received within the helical groove 60 of the first base portion 16. As the first base portion 16 is rotated relative to the second base portion 18, the projection 77 moves along the helical groove 60 in a proximal direction until the projection 77 moves into to the slot 62 to maintain the position of the platform 20 within the first base portion 16.

The platform 20 includes grooves 72 configured to receive the projections 46 of the second base portion 18. As the first base portion 16 is rotated relative the second base portion 18 and the platform 20 moves in a proximal direction, the platform 20 is rotationally locked to the second base portion 18. Thereby, the platform 20 moves toward the proximal end 24 of the second base portion 18 while being rotationally locked to the second base portion 18. Thus, as the platform 20 moves toward the proximal end 24 of the second base portion 18, the implant does not rotate relative the second base portion 18.

FIG. 5 illustrates a cross-sectional view of the cap 22. The cap 22 includes a body 78 extending from a proximal end surface 80 to a distal end surface 82. An opening 84 is provided at the distal end surface 82. The opening 84 extends from the distal end surface 82 to an inner cap surface 85. The inner cap surface 85 is opposite the proximal end surface 80. The cap 22 includes corresponding threads 86 that mate with the threads 34 on the engagement portion 32 of the second base portion 18. While mating threads are shown to couple the cap 22 to the second base portion 18, any coupling mechanism can be used to reversibly couple the cap 22 to the second base portion 18. Further, one-time use coupling mechanisms can also be utilized such that a seal is formed between the cap 22 and the second body portion 18. The seal can be broken once a user removes the cap 22 from the second body portion 18 such that the cap 22 cannot be hermetically sealed back to the housing 12.

In one embodiment, the cap 22 includes a plug 88 extending from the inner cap surface 85. The plug 88 includes a body 91 extending from the inner cap surface 85 to an end surface 95. The end surface 95 includes a healing screw bore 90 that is configured to receive, e.g., a healing screw 92. The healing screw bore 90 is configured to engage with the healing screw 92 such that when a user removes the cap 22, the healing screw 92 is retained within the healing screw bore 90 until a user removes the healing screw 92 from the healing screw bore 90. In one embodiment, the screw bore 90 includes a non-threaded portion 96 and a threaded portion 94. The non-threaded portion 96 engages a non-threaded portion 83 of the healing screw 92 and the threaded portion 94 engages a threaded portion 87 of the healing screw 92. Thus, the healing screw 92 can be at least partially threaded into the screw bore 90 until a user needs to remove the healing screw 92 from the cap 22 and insert it into the dental implant inserted into a patient's mouth.

The healing screw 92 also includes a head 81 and a driving bore 79 that is configured to receive a driving tool that can remove the healing screw 92 from the cap 22 and insert the healing screw 92 into the dental implant that is inserted into the patient's mouth. For example, the driving bore 79 can include non-rotational features and a driver having mating non-rotational features can impart torque to the healing screw 92 to remove the healing screw form the cap 22.

The plug 88 can be an integral piece with the cap 22 or can be a separate attachable component. For example, the inner cap surface 85 can include a recess 89 that is lockable with a projection 93 of the plug 91. In one embodiment, the plug 88 can be a separate attachable component such that the plug 91 including the appropriate screw bore 90 can be attached to the cap 22. That is, the type of healing screw 92 can vary depending on the type of dental implant secured within the housing 12. Thus, having the plug 88 as a separate attachable component allows for a cap 22 to be used with various plugs 91 having different screw bores 92 compatible with various healing screws 92. A length of the plug 88 can be based on various factors including, but not limited to, what type of platform 20 is used. In one embodiment, the end surface 95 can extend beyond the distal end surface 82 of the cap 22. In other embodiments, the distal end surface 95 can be level with the distal end surface 82 or recessed compared to the distal end surface 95. As discussed herein, a space between the head 81 of the healing screw 92 and a proximal surface of the implant can assist in maintaining the position of the dental implant within the platform 20.

FIG. 6A illustrates a cross-sectional view of the assembled dental implant packaging system 10 including the dental implant 102 and the healing screw 92. FIG. 6B illustrates the dental implant packaging 10 in FIG. 6A with the cap removed and the dental implant 102 presented to the user.

As show in FIG. 6A, the first base portion 16 and the second base portion 18 are coupled by the lip 40 being inserted into the corresponding annular groove 58. A portion of a dental implant 102 is positioned within the platform 20. A depth 100 of the bore 70 of the platform 20 that receives the dental implant 102 is sufficient such that the dental implant 102 maintains a radial and axial position when positioned within the platform 20. Various types of dental implants 102 can be used, but in the non-limiting example shown, the dental implant 102 includes a collar 110 and a threaded portion 103 configured to be threaded into a patient's bone. The dental implant 102 includes a bore 104 including at least a threaded portion 106 configured to engage with the threaded portion 87 of the healing screw 92 after the dental implant 102 is inserted into a patient's mouth. As seen in FIG. 6A, the platform 20 is at a first configuration where the dental implant 102 is contained within the housing 12. In one example, a top surface 111 of the dental implant 102, in the first configuration, is positioned within the second base portion 18. That is, the top surface 111 of the dental implant 102 does not extend past the top surface 36 of the second base portion 18.

As discussed herein, the bore 70 of the platform 20 receives a portion of the dental implant 102. Various methods can be used to maintain the position of the implant within the platform 20, e.g., during shipping, while also minimizing any, potential damage caused to the implant due to excessive movement during shipping, when the dental implant packaging system 10 may turn over and be subject to various external forces during handling and transportation. In one embodiment; the space between a distal portion extending from an inner cap surface can contact a portion of the dental implant 102 to retain the dental implant 102 within the bore 70. For example, the head 81 of the healing screw 92 can maintain the position of the dental implant 102 in the platform 20 with minimal movement. In another embodiment, a distal portion of the plug 91 can extend from the inner cap surface 85 such that the end surface 95 contacts a portion of the dental implant 102 to retain the dental implant 102 within the bore 70 and minimize the movement available to the dental implant 102 while secured within the dental implant packaging system 10.

As shown in FIG. 6B, the cap 22 has been removed and placed on the proximal end surface 80, such that the healing screw 92 can be presented to the user. In FIG. 6B, the platform 20 is at a second configuration where the dental implant 102 is being presented to the user. During use, a user can hold the second base portion 18 while turning the first base portion 16 to move the platform 20 to the second configuration where the dental implant 102 can easily be removed from the housing 12. In one embodiment, when in the second configuration, the top surface 111 of the dental implant 102 is above the top surface 36 of the second base portion 12. In one embodiment, the top surface 111 can be level with the top surface 36 of the second base portion 18. Additionally, in the second configuration, the top surface 111 of the dental implant 102 can be adjacent to the top surface 36, e.g., slightly below the top surface 36 of the second base portion 18. As seen in FIG. 6B, the protrusion 77 is now positioned within the slot 62 of the first base portion 16 that stops the movement and locks the position of the platform 20 within the housing 12. The dental implant 102 and the healing screw 92 in FIG. 6B are ready to be picked up by a user via a tool and/or by hand and directly implanted into the patient.

Figure 10:
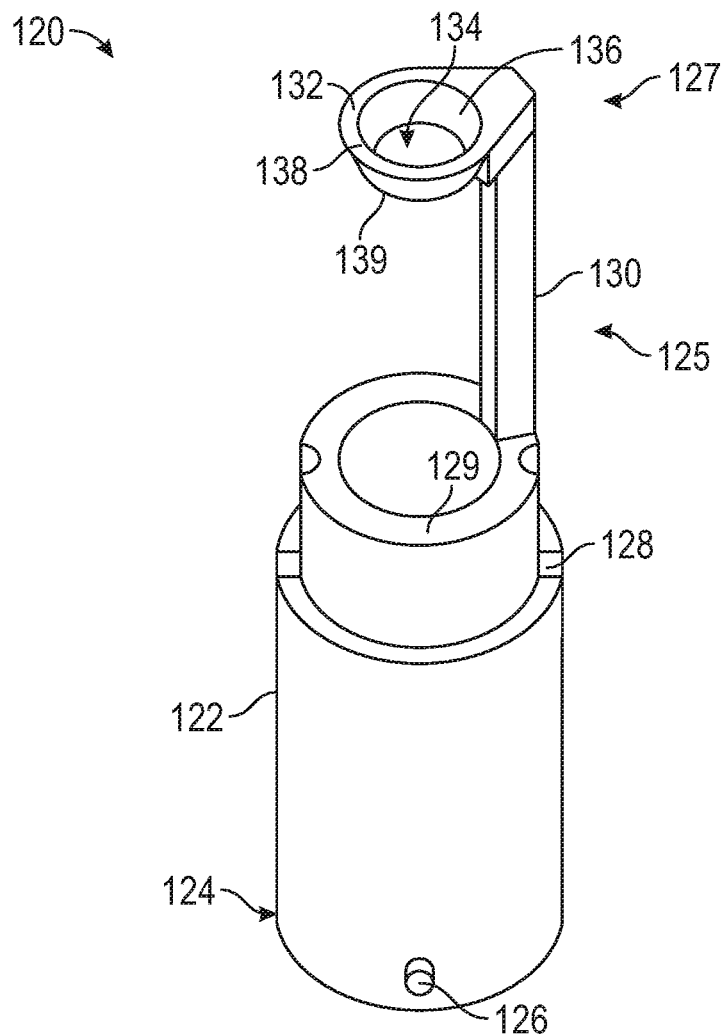
FIG. 10 illustrates a platform for use with the dental implant packaging system, in accordance with at least one example of the disclosure.

FIG. 10 illustrates another platform 120 for use with the dental implant packaging system 10, in accordance with at least one example of the disclosure. Similar to platform 20, platform 120 includes a body 122 having a projection 126 configured to move within the helical groove 60 of the first base portion 16. Further, platform 120 includes at least one slot 128 that is configured to receive a projection 46 of the second base portion 18. Thus, platform 120 can replace platform 20 in the dental implant packaging system 10 shown in FIG. 1. Platform 120 extends from a proximal end 127 to a distal end 124. The platform 120 includes a main body 122 extending from a top surface 129 to the distal end 124. The main difference between platform 20 and platform 120 is that platform 120 includes a different implant holder portion. For example, instead of including a bore 70 (shown in FIGS. 4A and 4B), implant holder portion 125 of platform 120 includes an elongated arm 130 extending from the top surface 129 of the main body 122 and an annular ring 132 defining a bore 134 that is configured to receive the dental implant. The annular ring 132 extends perpendicular to the longitudinal axis 15 (see FIG. 1). The annular ring 132 includes a top surface 138 and a bottom surface 139. The annular ring 132 includes a tapered surface 136 extending form the top surface 138 to the bottom surface 139 to retain the dental implant.

Figure 11:
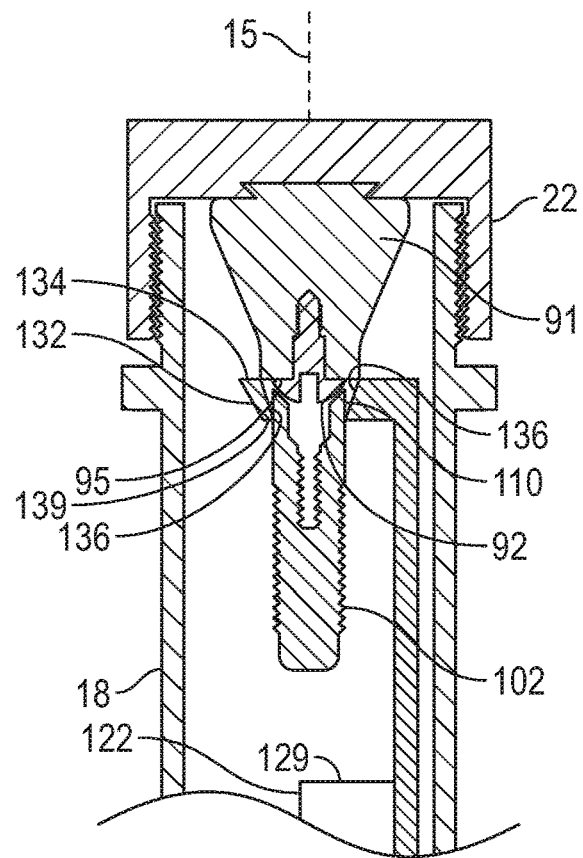
FIG. 11 illustrates a partial cross-sectional view of an assembled dental packaging system including the platform shown in FIG. 10.

FIG. 11 illustrates a cross-sectional view of the platform 120 positioned within the second base portion 18 including the cap 22. As seen in FIG. 11, the tapered surface 136 is configured to mate with a portion of the dental implant 102. The cap 22 includes the healing screw 92 as discussed herein. To retain the dental implant 102 within the annular ring 132, the end surface 95 of the plug 91 of the cap 22 or a portion of the healing screw 92 is configured to contact the top surface 128 of the annular ring 36 or the top surface of the dental implant to minimize the movement of the dental implant 102 from moving around. In one embodiment, the end surface 95 of the plug 91 is configured to contact a portion of the annular ring 36 to retain the dental implant 102 within the annular ring 132. Additionally, a space between the top surface of the dental implant 102 and either a portion of the plug 91 or healing screw 92 can be used to minimize the movement of the dental implant 102 within the annular ring 36, e.g., during shipment.

Figure 12:
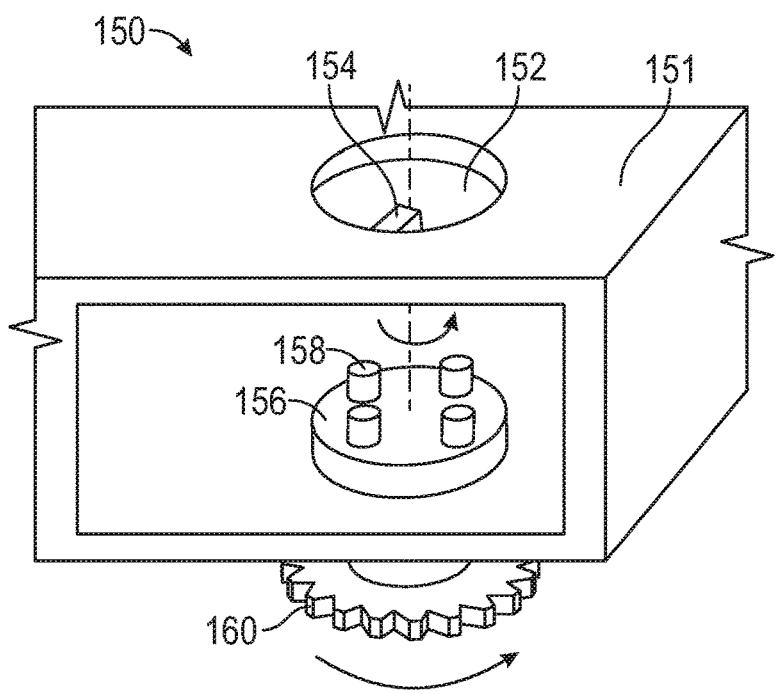
FIG. 12 illustrates a partial cutaway view of a surgical kit tray for use with the dental implant packaging, in accordance with at least one example of the disclosure.

FIG. 12 illustrates a partial cutaway view of a surgical kit tray 150 for use with the dental implant packaging systems disclosed herein. The surgical kit tray 150 includes a tray that can engage with the housing of the dental implant packaging systems disclosed herein. In one embodiment, the housing can engage with a gear or similar mechanism in the surgical kit tray 150 so that a knob or similar control (e.g., electronic push button control) on the tray can be used to cause the first base portion to rotate relative to the second base portion, thus raising the dental implant toward the proximal end of the second base portion for use.

The surgical kit tray 150 includes a tray 151 having a first base portion engagement feature 158 and a second base portion engagement feature 154. The first base engagement features 158 is coupled to the first base portion 16 and the second base portion engagement feature 154 is coupled to the second base portion 18. As shown in FIG. 12, the tray includes an opening 152 having the second base portion engagement feature 154 and a rotatable plate 156 including the first base portion engagement feature 158. The housing 12 can be inserted into the tray 152 such that recesses at the distal end of the first base portion 16 mate with the first base portion engagement features 158 and the second base portion 18 is non-rotationally inserted through the opening 152. For example, the body of the second base portion can include a slot configured to receive the second base portion engagement feature 154 to prevent rotation of the second base portion 18 when the first base portion 16 is rotated. Thus, instead of a user's hand holding the second base portion 18 while the first base portion 16 is rotated, the second base portion engagement features 154 maintains the position of the second base portion 18 while the first base portion is rotated.

The surgical kit tray 150 includes an actuator 160 that can be rotated manually or automatically, to rotate the rotatable plate 156 thus rotating the first base portion 16 relative to the second base portion 18, which has a fixed rotational position based on the location of the second base portion engagement feature 154. As discussed herein, as the first base portion 16 rotates relative to the second base portion 18, the platform that contains the dental implant moves proximally toward and in some cases past the second base portion so that the dental implant is presented to a user.

Figure 13:
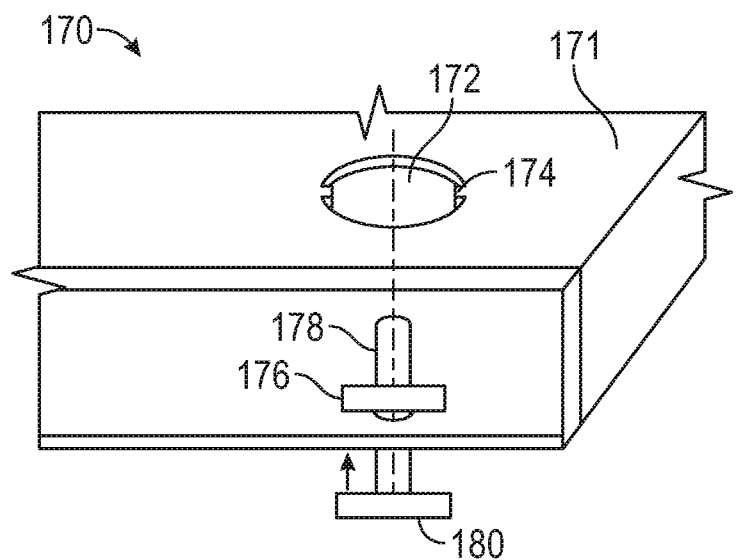
FIG. 13 illustrates a partial cutaway view of another surgical kit tray for use with a dental implant packaging, in accordance with at least one example of the disclosure.
Figure 14:
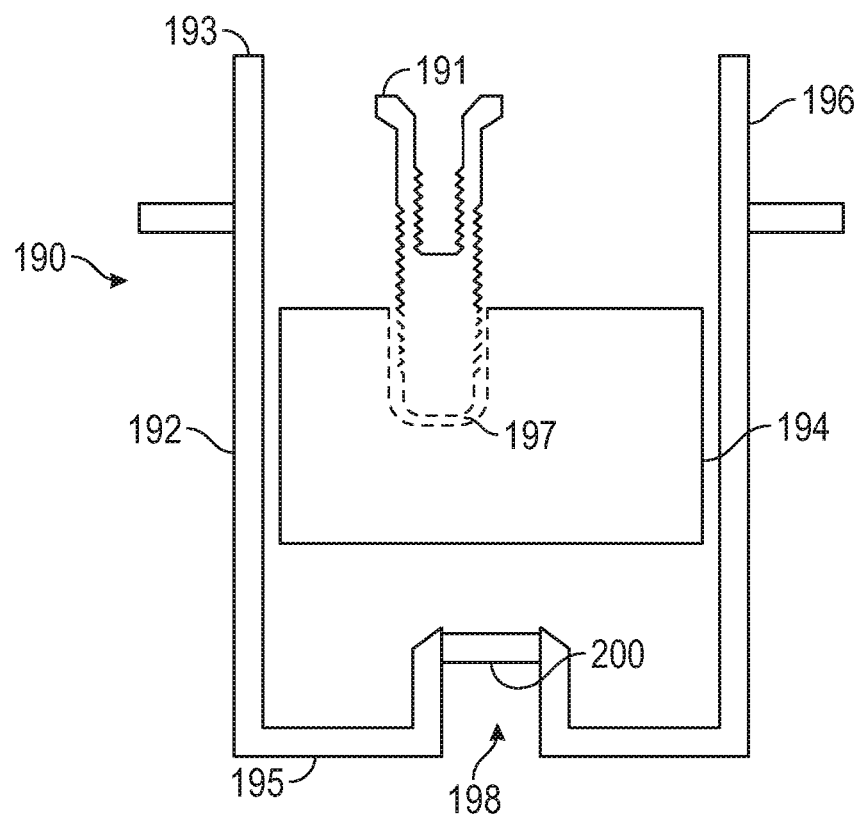
FIG. 14 illustrates a cross-sectional view of a dental implant packing system for use with the surgical kit tray shown in FIG. 13.

FIG. 13 illustrates a partial cutaway view of another surgical kit tray 170 for use with a dental implant packaging system 190 (shown in FIG. 14), in accordance with at least one example of the disclosure. FIG. 14 illustrates a cross-sectional view of the dental implant packing system 190 for use with the surgical kit tray 170 shown in FIG. 13.

The surgical kit tray 170 shown in FIG. 13 includes a tray 171 including an opening 172 having projections 174. As discussed herein the projections can engage with corresponding grooves in a housing 192 securing a dental implant 191. The tray 171 should interact with the housing 192 such that the housing 192 is rotationally and longitudinally fixed to the tray 171. The tray 171 includes a moveable plate 176 including a pin 178. The surgical kit tray 170 includes an actuator 180 that can be activated manually or automatically, to move in a proximal direction thus moving the pin 178 into the housing 192 to move the dental implant 194 proximally to present the dental implant 194 for use.

Instead of the housing 192 including a first and second base portion, the dental implant packaging system 190 includes a single housing 192 and a platform 194 that holds the dental implant 191. For simplicity, platform 194 is shown as a block including an opening 197 to receive the dental implant 191; however, platform 194 can be any platform disclosed herein. The housing 192 extends from a proximal surface 193 to a distal surface 195. The housing 192 includes an engagement portion 196 that, e.g., can include threads for mating with the cap (see cap 22). The distal surface 195 includes an opening 198 that is configured to receive the pin 178 when the housing 192 is coupled to tray 171. When the pin 178 moves into the opening 198, the pin 178 contacts the platform 194 and moves the platform 194, which includes the dental implant 191, proximally. Optionally, the housing 194 can include a breakable film 200 that can is used to seal the dental implant 191 within the housing 192. The breakable film 200 can be broken when the pin 178 moves into the opening 198 and into the housing 192.

Figure 15:
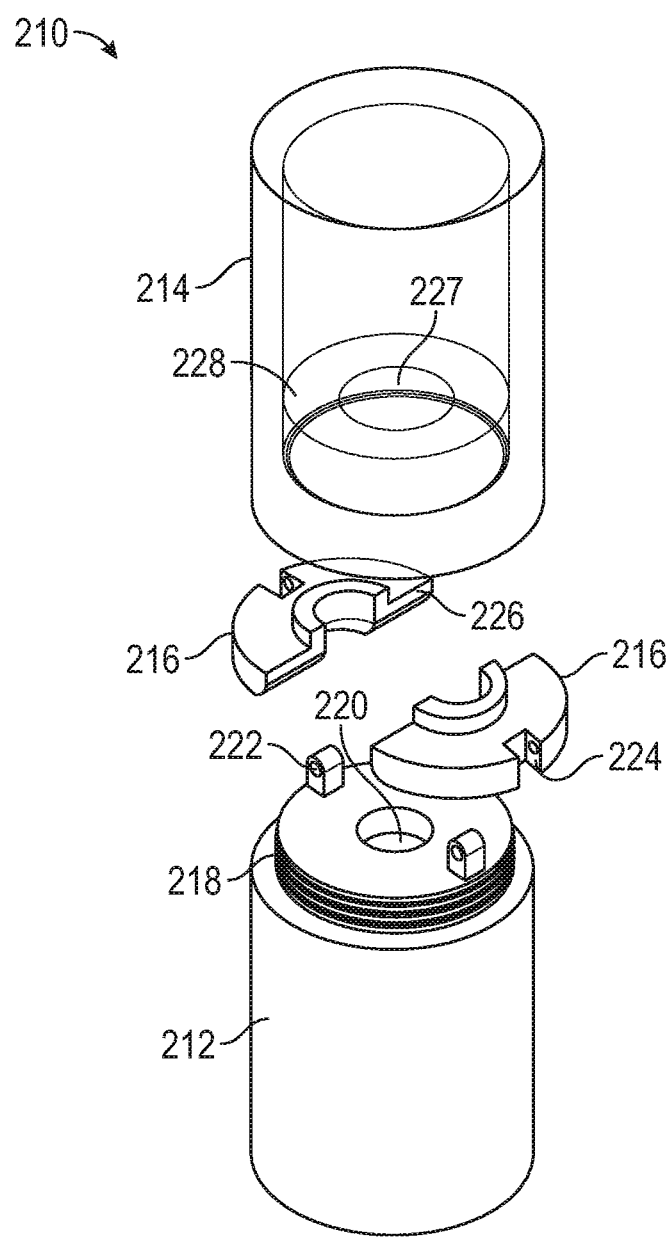
FIG. 15 illustrates an expanded view of a dental implant packaging system, in accordance with at least one example of the disclosure.
Figure 16:
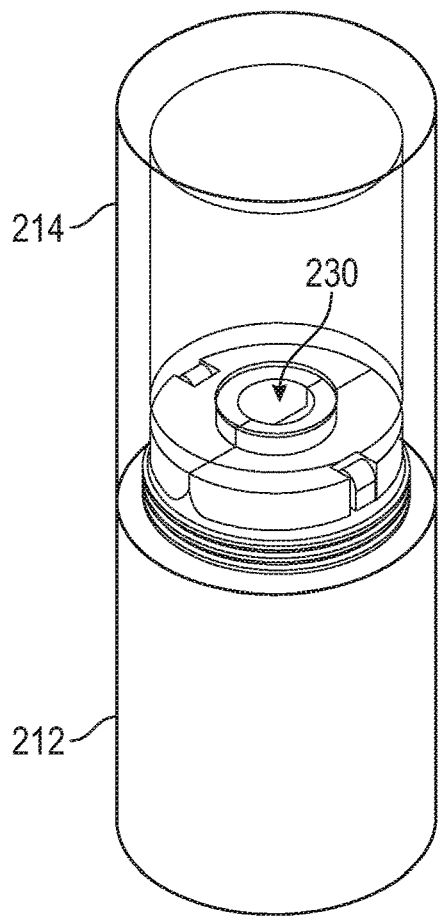
FIG. 16 illustrates an assembled view of the dental implant packaging system shown in FIG. 15.
Figure 17:
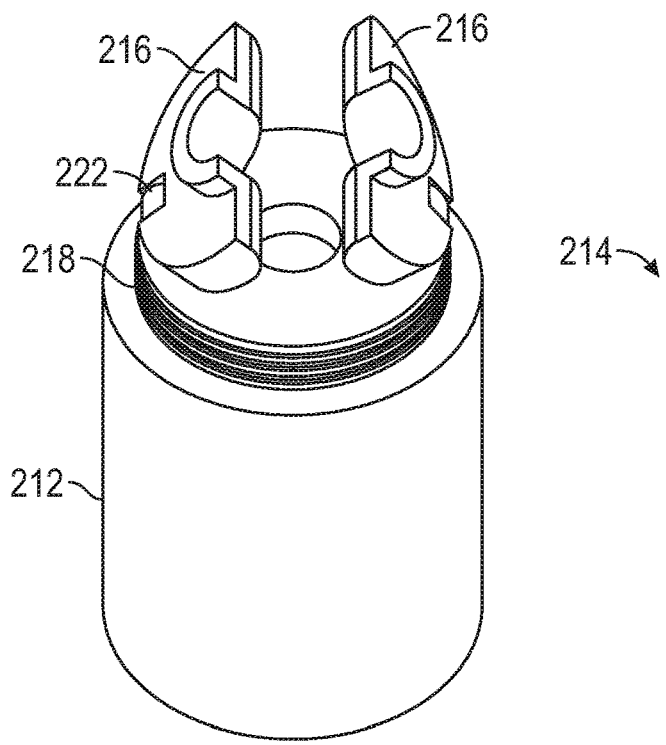
FIG. 17 illustrates a perspective view of a base of the dental implant packaging system shown in FIG. 15.
Figure 18:
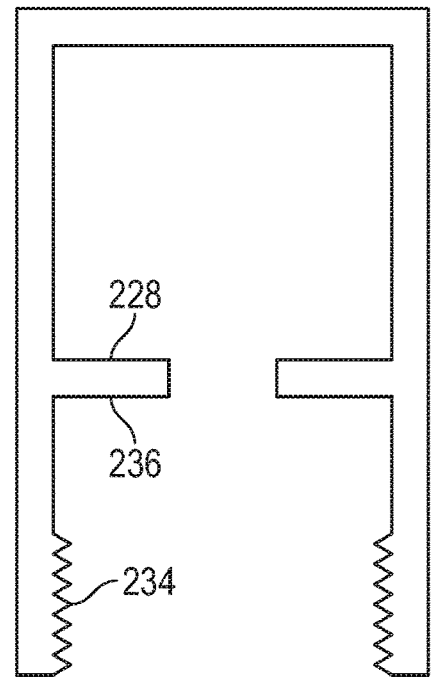
FIG. 18 illustrates a cross-sectional view of a cap of the dental implant packaging system shown in FIG. 15.

FIG. 15 illustrates an expanded view of a dental implant packaging system 210, in accordance with at least one example of the disclosure. FIG. 16 illustrates an assembled view of the dental implant packaging system 210 shown in FIG. 15. FIG. 17 illustrates a perspective view of a base 212 of the dental implant packaging system shown in FIG. 15. FIG. 18 illustrates a cross-section view of a cap 214 of the dental implant packaging system 210 shown in FIG. 15.

The dental implant packaging system 210 includes a base 212, two flaps 216, and a cap 214. The cap 214 can be formed from a transparent material such that the retained dental implant (not shown) can be viewed while the cap 21 is coupled to the base 212. The base 212 has an engagement portion 218 (e.g., including threads) that mate with corresponding threads 234 on the cap 214 (see FIG. 18). The base 212 includes projections 222 that are configured to interact with the flaps 216 to form a hinge. Further, the base 212 defines an implant bore 220 that can receive a portion of the dental implant. FIG. 17 illustrates the flaps 216 coupled to the projections 222 of the base 212 to form the hinge that the flaps 216 can rotate about. The flaps 216 include abutting surfaces 226 such that when the flaps 216 are perpendicular to the longitudinal axis 227, the flaps 216 define a bore 230 (see FIG. 16) that receives a portion of the dental implant. In one embodiment, the flaps 216 can be formed of a material such as silicone, polyurethane, foams, etc. The flaps 216 are configured to contact and maintain a position of the dental implant without damaging the external surface of the dental implant. When the cap 214 is coupled to the base 212, a ring 228 inside the cap 214 can contact and hold down the flaps 216 to prevent the dental implant from moving inside of the dental implant packaging system 210. For example, surface 236 of the ring 228 can contact a top surface of the flaps 216 such that the flaps remain in a substantially constant position, e.g., perpendicular to a longitudinal axis of the base 212. When the cap 213 is removed, a user can engage the dental implant and remove the dental implant form the base 212. The hinges 222 can be unbiased such that a minimal force can move them from closed configuration shown in FIG. 212 to an open configuration shown in FIG. 17. In one embodiment, the hinges 222 can be biased to the open configuration such that when the cap 214 is removed, the flaps 216 automatically go from the close configuration to the open configuration.

Figure 19:
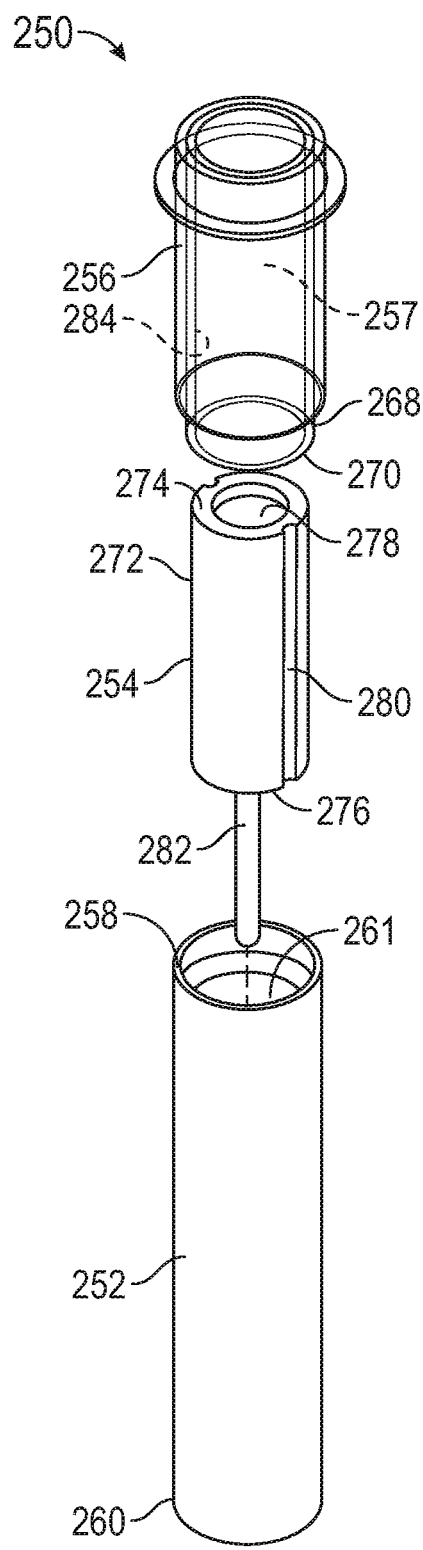
FIG. 19 illustrates an expanded view of a dental implant packaging system, in accordance with at least one example of the disclosure.
Figure 20:
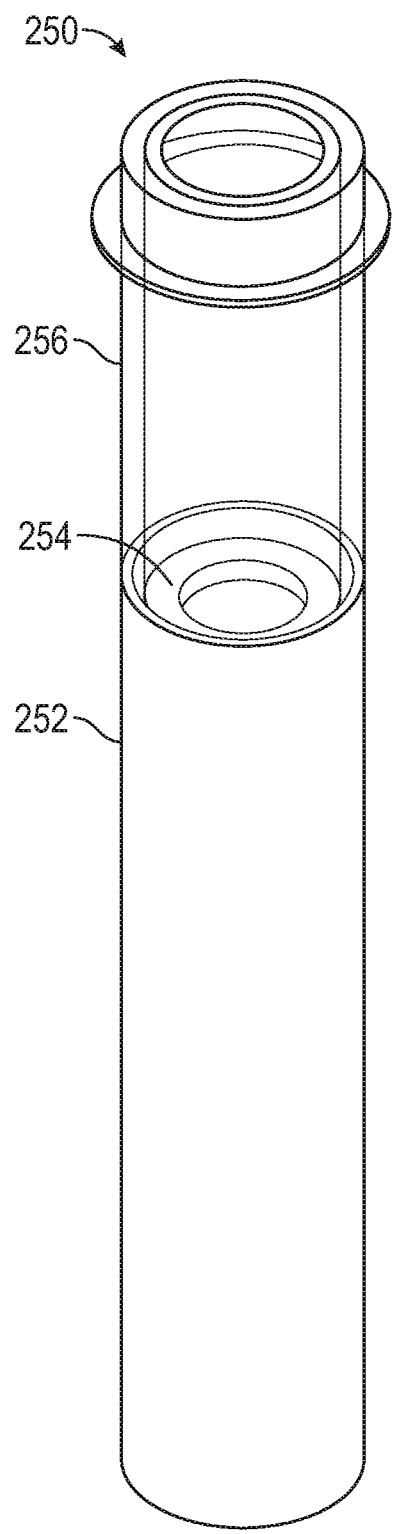
FIG. 20 illustrates an assembled view of the dental implant packaging system shown in FIG. 19.
Figure 21:
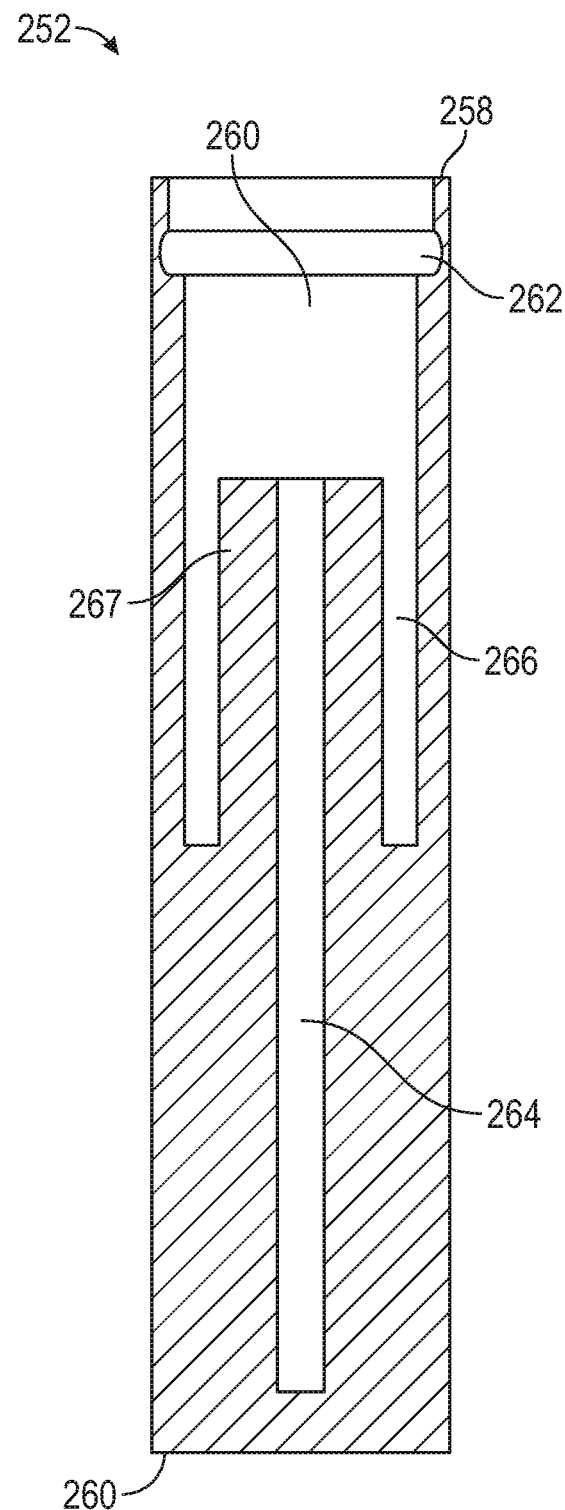
FIG. 21 illustrates a cross-sectional view the base shown in FIG. 19.
Figure 22:
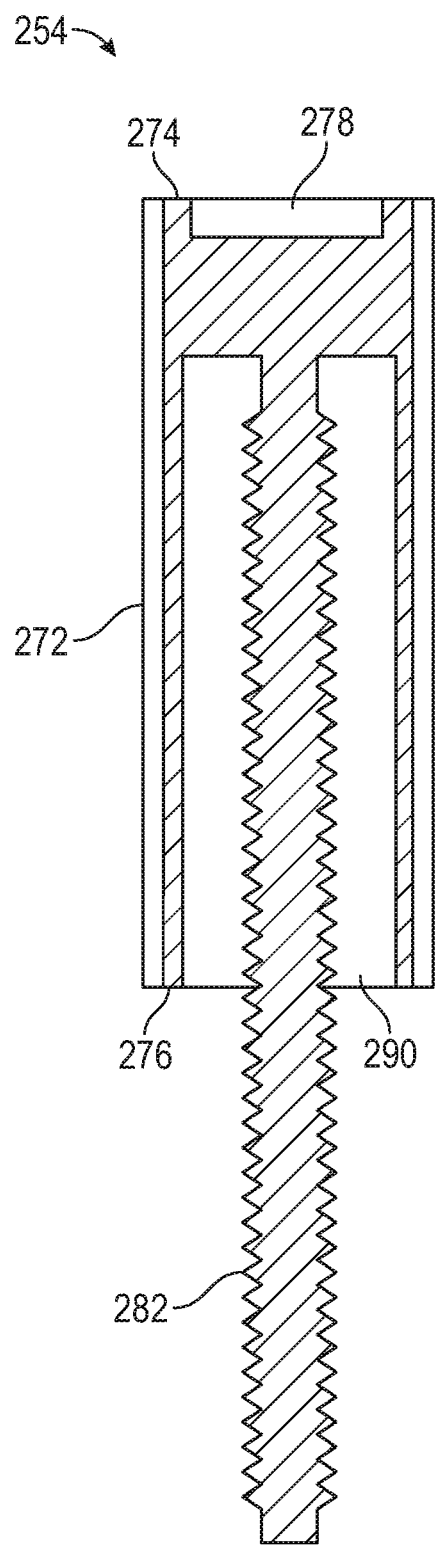
FIG. 22 illustrates a cross-sectional view of the platform shown in FIG. 19.
Figure 23:
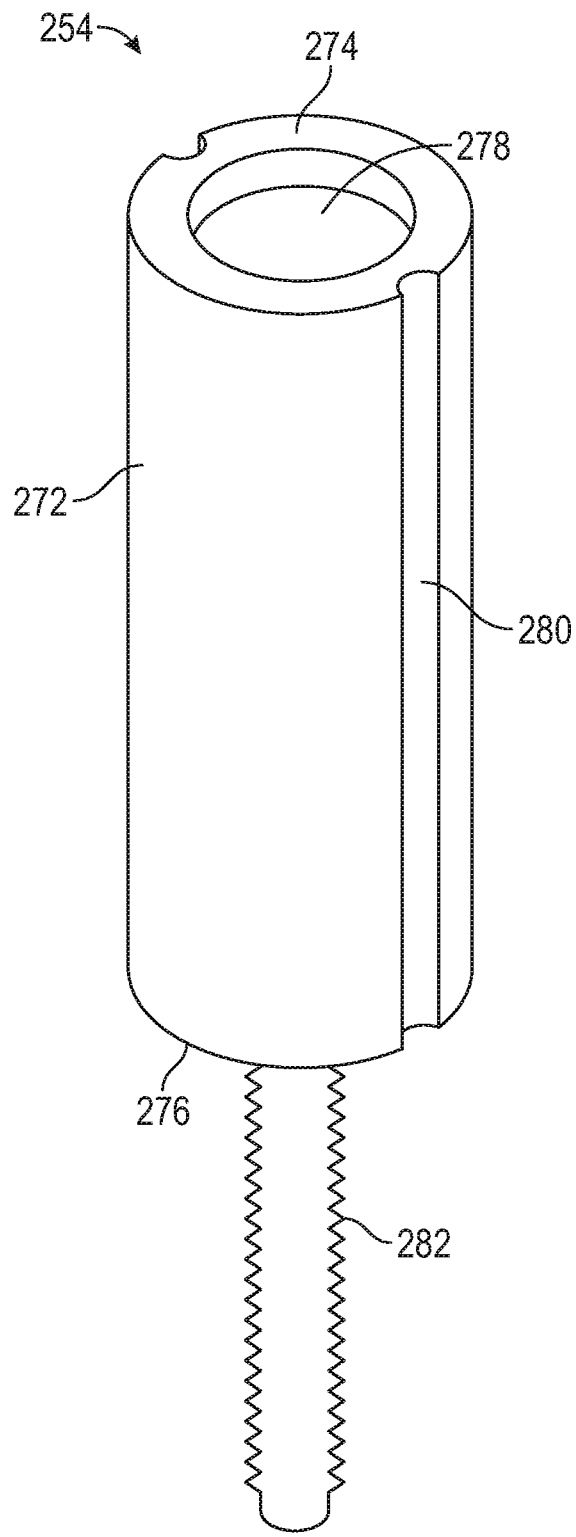
FIG. 23 illustrates a perspective view of the platform show in FIG. 22.

FIGS. 19-23 illustrate another embodiment of a dental implant packaging system 250, in accordance with at least one example of the disclosure. FIG. 19 illustrates an expanded view of the dental implant packaging system 250, FIG. 20 illustrates an assembled view of the dental implant packaging system 250. FIG. 21 illustrates a cross-sectional view the base 252, FIG. 22 illustrates a cross-sectional view of the platform 254, and FIG. 23 illustrates a perspective view of the platform 254 show in FIG. 22.

The dental implant packaging system 250 includes the base 252, the platform 254, and the cap 256. The base 252 extends from a proximal end surface 258 to a distal end surface 260. The proximal end surface 258 defines a bore 261 including an annular groove 262, an unthreaded bore portion 266, and a threaded bore section 264. As seen in FIG. 21, the unthreaded portion 266 of the bore 260 encircles a portion of the threaded bore portion 264.

The platform 254 includes a body 272 extending from a proximal end surface 274 to a distal end surface 276, The proximal end surface 274 defines a dental implant bore 278 configured to receive a dental implant (not shown). The body 272 includes at least two grooves 280 extending along the external surface of the body 272. The distal end 276 of the body 272 defines an annular bore 290 that encircles a threaded post 282 extending within and to a point external from the distal end surface 276.

The cap 256 includes a mating portion 268 similar to mating portion 38 shown in FIGS. 1, 2, and 6. Mating portion 268 includes a lip 270 that can be received within annular groove 262 when the cap 256 is coupled to the base 252. The cap 256 includes a bore 257 and at least one projection 284 extending along the bore 257.

To assemble the dental implant packaging system 250, the threaded post 282 is mated with the threaded bore 264 of the base 252. As the platform 254 is threaded into the base 252, a portion 267 of the base 252 will be positioned within the annular bore 290 of the platform 254 and the distal end surface 276 of the platform 254 will be positioned within the unthreaded portion 266 of the bore 260 of the base 252. While not shown, a dental implant can be positioned within the dental implant bore 278 of the platform such that the position of the dental implant with respect to the platform 254 is maintained. The cap 256 is coupled to the base 252 such that the lip 270 is coupled to the annular groove 262 and the projections 284 are positioned within the grooves 280 of the platform 254.

During use, as the cap 256 is held (e.g., by hand) and the base 252 is rotated, the platform 254 raises and lowers. For example, as the base 252 rotates relative to the cap 256, the threaded post 282 interacts with the threaded bore 264 to either raise or lower the platform 254 with respect to the base 252 and the cap 256. Since the platform 254 is rotationally locked with the cap 256, the platform 254 doesn't rotate with the base 252, but the torque applied to the base 252 is transmitted to the platform 254 to move the platform 254 along a longitudinal axis.

The platform 254 can be raised until the dental implant is in view and can be seen by the user through the cap 256. In some examples, the cap 256 can be removed when the dental implant is at a desired height such that once the cap 256 is removed a user can engage the dental implant for implanting in a patient. In other embodiments, the cap 256 can include a removable film at the top such that before base 252 is rotated, the film can be removed and the base 252 can be rotated to move the platform 254 in a proximal direction such that a top of the dental implant extends through an opening in the cap 256.

Various Notes & Examples

Example 1 is a dental implant packaging system for holding a dental implant. The dental implant packaging system includes a housing configured for holding the dental implant. The housing including: a base including a first base portion; and a second base portion rotatably coupled to the first base portion; and a platform configured to receive a portion of the dental implant and move within the base to present the dental implant to a user, and a cap configured to couple to the housing to secure the dental implant within the housing.

In Example 2, the subject matter of Example 1 optionally includes where rotation of the first base portion relative to the second base portion moves the platform in a proximal direction to present the dental implant to the user.

In Example 3, the subject matter of Example 2 optionally includes where the first base portion extends from a proximal end to a distal end and includes a bore extending from a proximal end surface toward the distal end, the bore including a helical groove extending along a length of the bore from the proximal end surface toward the distal end.

In Example 4, the subject matter of Example 3 optionally includes where the second base portion includes a body extending from a proximal end to a distal end, the second base portion including an engagement portion positioned toward the proximal end configured to couple with the cap and a mating portion positioned toward the distal end configured to rotatably couple with the first mating portion.

In Example 5, the subject matter of Example 4 optionally includes where the second base portion includes a bore extending from the proximal end to the distal end, the bore including at least one projection extending along a portion of the bore.

In Example 6, the subject matter of Example 5 optionally includes where the platform includes one projection extending from a body of the platform and at least one slot extending longitudinally along a portion of the body of the platform.

In Example 7, the subject matter of Example 6 optionally includes where the projection is configured to move within the helical groove of the first base portion when the first base portion is rotated relative to the second base portion and the at least one slot is configured to receive the at least one projection of the second base portion to rotationally lock the platform and the second base portion.

In Example 8, the subject matter of Example 7 optionally includes where the platform includes an implant holding portion configured to receive a portion of the dental implant.

In Example 9, the subject matter of Example 8 optionally includes where the platform, when at a first configuration, is positioned within the base such that a top surface of a dental implant is positioned within the second base portion of the base, and wherein the platform, when at a second configuration, is positioned within the base such that the top surface of a dental implant is positioned at least level to the top surface of the second base portion.

In Example 10, the subject matter of Example 9 optionally includes where the platform, when at the second configuration, is positioned within the base such that the top surface of the dental implant is outside of the second base portion.

In Example 11, the subject matter of Example 10 optionally includes where rotating the first base portion relative to the second base portion moves the platform from the first configuration to the second configuration as the projection on the platform moves within the helical groove of the first base portion.

In Example 12, the subject matter of Example 11 optionally includes where the bore of the first base portion includes defines a slot in communication with the helical groove configured to receive the projection of the platform to restrict axial movement of the platform along a longitudinal axis of the housing.

In Example 13, the subject matter of Example 12 optionally includes where the cap includes an opening extending from a distal end surface of the cap to an inner cap surface, the cap including a plug extending from the inner cap surface to a plug end surface, the plug configured to receive a healing screw that mates with the dental implant.

In Example 14, the subject matter of Example 13 optionally includes where the plug end surface defines a healing screw bore configured to receive and engage with the healing screw for use with the dental implant.

In Example 15, the subject matter of Example 14 optionally includes where the platform and the plug cooperate to retain the dental implant at a fixed position within the housing.

Example 16 is a dental implant packaging system, comprising: a housing configured for holding the dental implant, the housing including: a base, including: a first base portion; and a second base portion rotatably coupled to the first base portion; and a platform configured to receive a portion of the dental implant and move within the base to present the dental implant to a user; a cap configured to couple to the housing to secure the dental implant within the housing; a dental implant positioned at least partially within the platform; and a healing screw positioned within the cap, the healing screw configured to mate with the dental implant once implanted within the patient.

In Example 17, the subject matter of Example 16 optionally includes where the cap includes a plug extending from an inner cap surface, the plug configured to retain the healing screw.

In Example 18, the subject matter of Example 17 optionally includes wherein a portion of the platform and a portion of the plug engage the dental implant to secure the dental implant within the housing when the cap is coupled to the housing.

Example 19 is a method for implanting a dental implant within an implant site, the method comprising: providing a dental implant packaging system having a housing and a cap coupled to the housing, a dental implant contained within the housing, and a healing screw contained with the cap, the housing including: a first base portion rotatably coupled to a second base portion and a platform movable relative to the first and second base portions when the first base portion is rotated relative to the second base portion; removing the cap from the housing, the cap presenting the healing screw for use; rotating the first base portion relative to the second base portion to move the platform proximally to present the dental implant at least partially contained with the platform to a user; separating the dental implant from the housing to insert into a patient; and separating the healing screw from the cap and coupling the healing screw to the implanted dental implant.

In Example 20, the subject matter of Example 19 optionally includes wherein, while the platform moves proximally along a longitudinal axis of the housing relative to the second base portion, the platform and the second base portion have a fixed rotational position.

Example 21 is a surgical kit tray system, comprising: a tray configured for use with a dental implant packaging system. The surgical tray including a rotatable member including a first base engagement feature configured to engage with a first base portion of the dental implant packaging system; a second base engagement feature configured to engage with the second base portion; and an actuator configured to rotate the first base portion, such that the first base portion rotates relative to the second base portion and moves a platform contained within the first and second base portions proximally toward the second base portion.

In Example 22, the subject matter of Example 21 optionally includes where the tray includes an opening defining the second base engagement feature, the second base engagement feature being a projection configured to be received within a groove of the second base portion.

In Example 23, the subject matter of Example 22 optionally includes where the groove extends longitudinally along an external surface of the second base portion.

In Example 24, the subject matter of Examples 21 through 2.3 optionally include where the second base portion engagement feature is an opening having non-rotational shape, and wherein the cross-section of the second base portion has a corresponding non-rotational shape.

In Example 25, the subject matter of Examples 21 through 24 optionally include where the first base engagement feature is a bore formed within the rotatable member, the bore having a non-rotational shape configured to mate with the first base member, wherein the cross-sectional shape of the first base member corresponds to the non-rotational shape of the bore in the rotatable member.

Example 26 is a surgical kit tray system, comprising: a tray configured for use with a dental implant packaging system, the dental implant packaging system including a housing, a platform movable within the housing, the platform configured to receive a portion of a dental implant, and a cap configured to couple to the housing to secure the dental implant within the dental implant packaging system. The surgical tray including an opening configured to axially and rotationally fix the housing to the tray. The surgical tray including a moveable plate including a pin extending from a proximal surface of the moveable plate and an actuator that can move in a proximal direction to move the pin into an opening in the housing thereby moving the dental implant proximally to present the dental implant to a user.

In Example 27, the subject matter of Example 26 can optimally include where the opening is positioned along a distal end surface of the housing.

In Example 28, the subject matter of Examples 26 and 27 optionally include wherein the housing includes a breakable film sealing the opening of the housing.

Example 29 is a dental implant packaging system including a base defining a portion of a dental implant bore and two projections extending from a top surface of the base, two flaps coupled to the base at the projections such that the two flaps can rotate about the projections, wherein the two flaps have opposing surfaces such that when the two flaps are perpendicular to a longitudinal axis of the dental implant packaging system, the two opposing surface abut each other and form a second portion of the dental implant bore, the dental implant bore configured to receive a dental implant, and the cap configured to engage a portion of the base, the cap including a ring on the inside of the cap that contacts and holds down the flaps to prevent the dental implant from moving inside of the dental implant packaging system 210.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any, documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled, The invention claimed includes:

1. A dental implant packaging system for folding a dental implant, comprising:
    a housing configured for holding the dental implant, the housing including:
        a base, including:
            a first base portion; and
            a second base portion rotatably coupled to the first base portion; and
            a platform configured to receive a portion of the dental implant and move within the base to present the dental implant to a user; and
    a cap configured to couple to the housing to secure the dental implant within the housing, wherein the platform is rotationally locked to the second base portion such that, as the first base portion is rotated relative to the second base portion of the housing, the platform moves toward a proximal end surface of the second base portion and a rotational position of the second base portion and the platform remains substantially constant as the first base portion rotates.

2. The dental implant packaging system of claim 1, wherein rotation of the first base portion relative to the second base portion moves the platform in a proximal direction relative to the first base portion.

3. The dental implant packaging system of claim 2, wherein the platform and second base portion are rotationally locked by engagement of a groove and a projection and wherein the first base portion extends from a proximal end to a distal end and includes a bore extending from a proximal end surface toward the distal end, the bore including a helical groove extending along a length of the bore from the proximal end surface toward the distal end.

4. The dental implant packaging system of claim 3, wherein the second base portion comprises a bore extending from the proximal end to the distal end to telescopically receive the platform, wherein the groove extends longitudinally along a portion of an exterior body of the platform, and the projection extends inwardly from an interior surface of the bore of the second base portion, and wherein the second base portion includes a body extending from a proximal end to a distal end, the second base portion including an engagement portion positioned toward the proximal end configured to couple with the cap and a mating portion positioned toward the distal end configured to rotatably couple with the first base portion.

5. The dental implant packaging system of claim 4, wherein the platform includes at least one projection extending perpendicular from a body of the platform and engages the helical groove of the first base portion.

6. The dental implant packaging system of claim 5, wherein the at least one projection extending perpendicular from a body of the platform is configured to move within the helical groove of the first base portion when the first base portion is rotated relative to the second base portion and the groove extending longitudinally along the portion of the exterior body of the platform is configured to receive at least one projection of the second base portion to rotationally lock the platform and the second base portion.

7. The dental implant packaging system of claim 6, wherein the platform includes an implant holding portion configured to receive a portion of the dental implant.

8. The dental implant packaging system claim 7, wherein the platform, when at a first configuration, is positioned within the base such that a top surface of a dental implant is positioned within the second base portion of the base, and wherein the platform, when at a second configuration, is positioned within the base such that the top surface of a dental implant is positioned at least level to the top surface of the second base portion.

9. The dental implant packaging system of claim 8, wherein the platform, when at the second configuration, is positioned within the base such that the top surface of the dental implant is outside of the second base portion.

10. The dental implant packaging system of claim 9, wherein rotating the first base portion relative to the second base portion moves the platform from the first configuration to the second configuration as the projection on the platform moves within the helical groove of the first base portion.

11. The dental implant packaging system of claim 10, wherein the bore of the first base portion includes a slot in communication with the helical groove configured to receive the projection of the platform to restrict axial movement of the platform along a longitudinal axis of the housing.

12. The dental implant packaging system of claim 1, wherein the second base portion includes a bore extending from the proximal end to a distal end, the bore including at least one projection extending longitudinally along a portion of the bore to engage at least one groove extending longitudinally along a portion of a body of the platform.

13. The dental implant packaging system of claim 1, wherein the platform and second base portion are rotationally locked by engagement of a groove and a projection and wherein the cap includes an opening extending from an end surface of the cap to an inner cap surface, the cap including a plug extending from the inner cap surface to a plug end surface, the plug configured to receive a healing screw that mates with the dental implant.

14. The dental implant packaging system of claim 13, wherein the second base portion comprises a bore extending from the proximal end to a distal end to telescopically receive the platform, wherein the groove extends longitudinally along a portion of an exterior body of the platform, and the projection extends inwardly from an interior surface of the bore of the second base portion, and wherein the plug end surface defines a healing screw bore configured to receive and engage with the healing screw for use with the dental implant.

15. The dental implant packaging system of claim 14, wherein the platform and the plug cooperate to retain the dental implant at a fixed position within the housing.

16. A dental implant packaging system, comprising:
a housing configured for holding a dental implant, the housing including:
a base, including:
a first base portion; and
a second base portion rotatably coupled to the first base portion; and
a platform configured to receive a portion of the dental implant and move within the base to present the dental implant to a user;
a cap configured to couple to the housing to secure the dental implant within the housing;
a dental implant positioned at least partially within the platform; and
a healing screw positioned within the cap, the healing screw configured to mate with the dental implant once implanted within a patient, wherein the platform is rotationally locked to the second base portion such that, as the first base portion is rotated relative to the second base portion of the housing, the platform moves toward a proximal end surface of the second base portion and a rotational position of the second base portion and the platform remains substantially constant as the first base portion rotates.

17. The dental implant packaging system of claim 16, wherein the platform and second base portion are rotationally locked by engagement of a groove and a projection and wherein the cap includes a plug extending from an inner cap surface, the plug configured to retain the healing screw.

18. The dental implant packaging system of claim 17, wherein the second base portion comprises a bore extending from the proximal end to a distal end to telescopically receive the platform, wherein the groove extends longitudinally along a portion of an exterior body of the platform, and the projection extends inwardly from an interior surface of the bore of the second base portion, and wherein a portion of the platform and a portion of the plug engage the dental implant to secure the dental implant within the housing when the cap is coupled to the housing.

19. A method for implanting a dental implant within an implant site, the method comprising:
providing a dental implant packaging system having a housing and a cap coupled to the housing, a dental implant contained within the housing, and a healing screw contained with the cap, the housing including:
a first base portion rotatably coupled to a second base portion and a platform movable relative to the first and second base portions when the first base portion is rotated relative to the second base portion;
removing the cap from the housing, the cap presenting the healing screw for use;
rotating the first base portion relative to the second base portion to move the platform proximally to present the dental implant at least partially contained with the platform to a user, wherein, while the platform moves proximally along a longitudinal axis of the housing relative to the second base portion, the platform and the second base portion have a fixed rotational position relative to each other;
separating the dental implant from the housing to insert the dental implant into a patient; and separating the healing screw from the cap and coupling the healing screw to the implanted dental implant.

20. The method of claim 19, wherein, as the first base portion is rotated relative to the second base portion, the platform moves toward a proximal end surface of the second base portion and a rotational position of the second base portion and the platform remains substantially constant as the first base portion rotates, wherein the platform and second base portion are rotationally locked by engagement of a groove and a projection, wherein the second base portion comprises a bore extending from the proximal end to a distal end to telescopically receive the platform, and wherein the groove extends longitudinally along a portion of an exterior body of the platform, and the projection extends inwardly from an interior surface of the bore of the second base portion.

\* \* \* \* \*